US012383858B2

(12) United States Patent
Wang et al.

(10) Patent No.: US 12,383,858 B2
(45) Date of Patent: Aug. 12, 2025

(54) ENERGY-SAVING SYSTEM AND METHOD FOR DIRECT AIR CAPTURE WITH PRECISE ION CONTROL

(71) Applicant: Zhejiang University, Zhejiang (CN)

(72) Inventors: Tao Wang, Hangzhou (CN); Weishan Liu, Hangzhou (CN); Mengxiang Fang, Hangzhou (CN); Xiang Gao, Hangzhou (CN); Zhongyang Luo, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/251,346

(22) PCT Filed: Dec. 16, 2022

(86) PCT No.: PCT/CN2022/139459

§ 371 (c)(1),
(2) Date: May 1, 2023

(87) PCT Pub. No.: WO2023/138272

PCT Pub. Date: Jul. 27, 2023

(65) Prior Publication Data

US 2024/0342641 A1 Oct. 17, 2024

(30) Foreign Application Priority Data

Jan. 21, 2022 (CN) ........................ 202210070294.X

(51) Int. Cl.
*B01D 53/04* (2006.01)
*B01D 61/46* (2006.01)
(Continued)

(52) U.S. Cl.
CPC ........... *B01D 53/04* (2013.01); *B01D 61/463* (2022.08); *B01D 71/281* (2022.08); *B01D 71/36* (2013.01);
(Continued)

(58) Field of Classification Search
CPC .............. B01D 53/04; B01D 2257/504; B01D 61/463; B01D 71/281; B01D 71/36;
(Continued)

(56) References Cited

U.S. PATENT DOCUMENTS 11,219,860 B1 * 1/2022 Jakobsen ................ C02F 1/441
2022/0097004 A1 * 3/2022 Makaruk ............ B01D 53/1425

FOREIGN PATENT DOCUMENTS

CN 101670236 A * 3/2010 ............. B01D 53/62

OTHER PUBLICATIONS

English Translation of the Witten Opinion of the International Searching Authority for PCT/CN2022/139459, mailed Mar. 11, 2023 (Year: 2023).*

* cited by examiner

*Primary Examiner* — Robert Clemente
(74) *Attorney, Agent, or Firm* — C. Tumey Law Group PLLC

(57) ABSTRACT

Disclosed is an energy-saving system and method for direct air capture with precise ion control. The system includes an air conveying device, an air distribution device and a $CO_2$ adsorption device with a moisture swing adsorbent with high $CO_2$ adsorption capacity, where the air conveying device, the air distribution device and the $CO_2$ adsorption device are connected in sequence, and the $CO_2$ adsorption device is provided with a spray desorption device; a valence-state ion sieving device; a pH swing regeneration device; and a $CO_2$ regeneration device. In accordance with the energy-saving
(Continued)

system provided by the present disclosure, ultra-low concentration of $CO_2$ in the air can be enriched to the concentration of 95% step by step for industrial application or biological application at room temperature and pressure by consuming the electricity which cannot be connected to a power grid.

11 Claims, 2 Drawing Sheets

(51) Int. Cl.
*B01D 71/28* (2006.01)
*B01D 71/36* (2006.01)
*C01B 32/50* (2017.01)

(52) U.S. Cl.
CPC ........ *C01B 32/50* (2017.08); *B01D 2257/504* (2013.01); *B01D 2258/06* (2013.01); *B01D 2259/40083* (2013.01); *B01D 2313/345* (2013.01)

(58) Field of Classification Search
CPC .... B01D 2259/40083; B01D 2313/345; B01D 53/1475; C01B 32/50
See application file for complete search history.

ENERGY-SAVING SYSTEM AND METHOD FOR DIRECT AIR CAPTURE WITH PRECISE ION CONTROL

CROSS-REFERENCE TO RELATED APPLICATION

This patent application is a national stage application of International Patent Application No. PCT/CN2022/139459, filed on Dec. 16, 2022, which claims the benefit and priority of Chinese Patent Application No. 202210070294.X, filed with the China National Intellectual Property Administration on Jan. 21, 2022, the disclosure of which is incorporated by reference herein in its entirety as part of the present application.

TECHNICAL FIELD

The present disclosure relates to the technical field of direct air capture, and in particular relates to an energy-saving system and method for direct air capture with precise ion control.

BACKGROUND

At present, the concentration of carbon dioxide in the atmosphere has exceeded 417 ppm, and is increasing year by year at the rate of 2 ppm per year. The carbon dioxide capture, utilization and storage (CCUS) technology has been considered as the most economical and feasible method to reduce greenhouse gas emissions and mitigate global warming on a large scale in the future. The scale application of the technology is conducive to significant reduction of carbon dioxide emissions in the short term and effective mitigation of the greenhouse effect.

The direct air capture (DAC) technology is an important CCUS technology, and is also essential negative emission technology.

At present, the DAC technology mainly includes high-temperature chemical absorption methods and solid adsorption methods.

The working principle of the high-temperature chemical absorption method is as follows: the alkaline absorbent is used to absorb $CO_2$, and then the absorbent reacts with calcium hydroxide to generate precipitated calcium carbonate and to regenerate alkaline absorbent. The calcium oxide for regenerating calcium hydroxide is regenerated by heating the calcium carbonate to a temperature as high as 900° C. is, while high-purity carbon dioxide is obtained.

The solid adsorption method mainly includes a high-temperature alkali/alkaline-earth metal-based solid adsorption method and a low-temperature solid adsorption method. In the alkali/alkaline-earth metal-based solid adsorption method, adsorption is mostly carried out at room temperature, and then regeneration is achieved at a heating temperature of 250° C. to 900° C. The energy consumption for the regeneration of the adsorbent is very high, and the regeneration is highly dependent on heat sources. In the low-temperature solid adsorption method, the solid adsorbent is generally used to adsorb carbon dioxide in the air, and then the steam at a certain temperature is used to regenerate the adsorbent and desorb the $CO_2$, and during the regeneration, the water vapor higher than 100° C. is generally required to regenerate the adsorbent and desorb the $CO_2$.

At present, in accordance with the direct air capture technology, the process of directly increasing the carbon dioxide at the ultra-low partial pressure (with the concentration of 400 ppm) in the air to the concentration of more than 95% requires intensive regeneration energy, which leads to the high capture cost of the direct air capture technology. Meanwhile, the technology has the problems of complicated operation in the regeneration process and huge equipment volume.

Moreover, with rapid development of the renewable energy sources, the problems related to excess renewable energy and storage difficulties have arisen.

The technology of electrochemically producing alkaline solution and acid solution has gradually re-entered the attention of scholars. The technology of electrochemically regenerating alkaline solution and acid solution has the advantages of small equipment volume, normal temperature regeneration process, and capability of obtaining high-purity carbon dioxide by only consuming renewable energy. The electrochemical regeneration mode has become a promising regeneration technology of the direct air capture technology.

The theoretical energy consumption of the reported electrochemical regeneration system at present is still at a high level. Moreover, there are different operation conditions in the actual operation process, which may rapidly increase the energy consumption in the regeneration process. For example, under the condition that the alkaline solution does not completely absorb carbon dioxide or only absorbs a small amount of carbon dioxide, the process of regenerating carbon dioxide by adding acid may neutralize the unreacted alkali, resulting in a great waste of energy.

Therefore, the coupling of the electrochemical regeneration system and the system for direct air capture may improve the concentration of carbon dioxide step by step, the precise control of the regeneration process of the coupled system for direct air capture can effectively improve the energy utilization rate of the system and adapt to the changes of different working conditions.

SUMMARY

To the problems of high temperature, high energy consumption and high cost in the actual operation process of the existing direct air capture technology, the present disclosure provides an energy-saving system for direct air capture with precise ion control, which may enrich $CO_2$ with the air concentration (400 ppm) to $CO_2$ with the concentration of 95% for industrial or biological applications at room temperature and pressure by only consuming the electricity that cannot be connected to a power grid. The system provided by the present disclosure may precisely control the regeneration process, improve the concentration of $CO_2$ step by step, and effectively reduce the energy consumption of the system for direct air capture as well as the carbon footprint in the system process, and its large-scale application is conducive to reducing the $CO_2$ emissions in the atmosphere.

An energy-saving system for direct air capture with precise ion control includes:

an air conveying device, an air distribution device, and a $CO_2$ adsorption device internally provided with a moisture swing adsorbent with high $CO_2$ adsorption capacity, where the air conveying device, the air distribution device and the $CO_2$ adsorption device are connected in sequence, and the $CO_2$ adsorption device is provided with a spraying desorption device;

a valence-state ion sieving device, where valence ion selective anion membranes and cation membranes through which OH" can pass but $CO_3^{2-}$ is prevented are alternately arranged, and an anode plate and a cathode plate are arranged on both sides of the valence-state ion sieving device to form a constant electric field. In the valence-state ion sieving device, an $OH^-$ removing chamber receives desorption solution flowing out from the $CO_2$ adsorption device, and the aqueous solution rich in $CO_3^{2-}$ flowing out from an outlet of the $OH^-$ removing chamber is pumped into a $CO_2$ regeneration device, and an outlet of the $OH^-$ receiving chamber is connected with a pH swing regeneration device;

a pH swing regeneration device, which employs a pH swing regeneration system and is configured to produce acid solution and to concentrate alkaline solution, where the concentrated alkaline solution outlet is connected to a spraying device, the produced acid solution flows into the $CO_2$ regeneration device to react with the aqueous solution rich in $CO_3^{2-}$ to generate high-purity $CO_2$ gas, or is partially pumped into the $CO_2$ regeneration device to react with the aqueous solution rich in $CO_3^{2-}$ to generate $CO_2$ gas and is partially concentrated to obtain concentrated acid solution; and a $CO_2$ regeneration device, where the acid solution after the $CO_2$ regeneration is completed flows into the $OH^-$ receiving chamber of the valence-state ion sieving device, or is partially pumped into the $OH^-$ receiving chamber of the ion sieving device, and is partially pumped into the pH swing regeneration device.

In a preferred embodiment, the moisture swing adsorbent with high $CO_2$ adsorption capacity in the $CO_2$ adsorption device includes at least one of quaternary ammonium-based or quaternary phosphonium-based resin, lignin, activated carbon, molecular sieve and metal organic framework, which has the function of spraying alkaline solution or aqueous solution to release $CO_2$, and may be in the form of solid adsorbents, including basic ion exchange resin, amine supported molecular sieve, amine supported metal organic framework, amine supported activated carbon, etc., the absorbents may be arranged in the form of particles or sheets, or may be directly absorbed by spraying alkaline solution with absorption tower.

In accordance with an energy-saving system for direct air capture with precise ion control, an electrochemical regeneration system thereof includes a valence-state ion sieving device, a pH swing regeneration device, and a $CO_2$ regeneration device. The electrochemical regeneration system may serve as a central processing unit, multiple capture units are coupled by the central processing unit to form a continuous module with precise control system, which is convenient to scale up. The capture units include a $CO_2$ adsorption device, an air conveying device and an air distribution device.

In accordance with an energy-saving system for direct air capture with precise ion control, the principle thereof is to achieve adsorption and release of carbon dioxide by using the pH swing. 400 ppm carbon dioxide in the air is concentrated to 1% to 5% on the adsorbent at first, and then is concentrated to 95% or more by the electrochemical system in the next step.

The alkaline solution sprayed by the spraying device preferably includes at least one of organic amine, sodium hydroxide, potassium hydroxide, phosphate and sulfate, and the content of hydroxide ion preferably ranges from 0.1 mol/L to 3 mol/L.

In accordance with an energy-saving system for direct air capture with precise ion control, the energy saving property thereof is that the energy consumption of the valence-state ion sieving device is much less than that of the pH swing regeneration device. The valence-state ion sieving device may selectively sieve out high-concentration OH" from the mixed solution of carbonate and hydroxide, instead of the original way of neutralization with acid solution, the recycle of alkaline solution and the storage of acid solution are achieved, and therefore the energy-saving effect is achieved.

In a preferred embodiment, the concentration of carbonate ion and the concentration of hydroxide ion in the desorption solution flowing out from the $CO_2$ adsorption device are from 0.1 mol/L to 1 mol/L and from 0.05 mol/L to 2 mol/L, respectively.

In a preferred embodiment, structural parameters are designed according to the solution treatment capacity in the valence-state ion sieving device, when the solution treatment capacity is 1 liter:

the number of the anion membranes is from 1 to 30, and the area of a single anion membrane is from 100 $cm^2$ to 1,000 $cm^2$.

A basis unit of the valence-state ion sieving device is composed of a cathode plate, a partition plate, a cation membrane, a partition plate, an anion membrane, a partition plate, a cation membrane, a partition plate, and an anode plate.

The cathode plate material includes at least one of titanium-ruthenium-iridium electrodes, carbon electrodes, and stainless-steel electrodes.

The anode plate material includes at least one of ruthenium-iridium coating electrodes, lead plate electrodes, and stainless-steel electrodes.

The solution employed by the valence-state ion sieving device includes at least one of potassium ferricyanide, quinone organic compounds, organic amine, sodium hydroxide, potassium hydroxide, phosphate, and sulfate.

The cation membrane is at least one of polytetrafluoroethylene sulfonated acid-based cation exchange membranes and polystyrene sulfonated acid membranes.

Valence selective anion membranes in the valence-state ion sieving device may be purchased through commercial channels, such as ACS anion sieving membranes from ASTOM Company in Japan, ASVN anion sieving membranes from Asahi Glass AGC Company in Japan, FAP anion sieving membranes from Fumatech Company in Germany, etc.

The present disclosure further provides an energy-saving method for direct air capture with precise ion control, which utilizes the energy-saving system for direct air capture with precise ion control.

The energy-saving method for direct air capture with precise ion control includes the following steps:

The air enters a $CO_2$ adsorption device through an air conveying device and an air distribution device, and then is discharged after $CO_2$ is adsorptively separated in the $CO_2$ adsorption device;

alkaline solution is sprayed by a spraying device to react with $CO_2$ adsorbed by a moisture swing adsorbent with high $CO_2$ adsorption capacity for desorption, the obtained desorption solution containing carbonate ions and hydroxide ions enters a valence-state ion sieving device, and then enters a $CO_2$ regeneration device to react with acid solution with pH from 2 to 5 after the hydroxide ions are removed, and the generated $CO_2$ gas is collected;

the reacted acid solution in the $CO_2$ regeneration device flows into the valence-state ion sieving device, or is partially pumped into the valence-state ion sieving device and is partially pumped into a pH swing regeneration device;

the acid solution entering the valence-state ion sieving device flows into the pH swing regeneration device after receiving the hydroxide ions, regenerated alkaline solution flows into the spraying device, and regenerated acid solution flows into the $CO_2$ regeneration device, or is partially pumped into the $CO_2$ regeneration device and is partially concentrated to obtain concentrated acid solution.

In accordance with the present disclosure, the concentration of acid required by regeneration is much less than the concentration of the alkaline solution during spraying, and thus only a small amount of alkali is consumed after the waste acid enters the valence-state ion sieving device, and the solution circulation of the system can be achieved without generating wastewater.

The desorption solution of the $CO_2$ adsorption device can flow into the next air adsorption circulation after flowing out, the air may be used to purge the adsorbent dry while absorbing the $CO_2$, thus carrying out direct air capture and regeneration process.

In a preferred embodiment, one basis unit of the valence-state ion sieving device has an operating voltage from 1.5 V to 5 V, an operating current from 0.1 A to 10 A, and an operating temperature from 5° C. to 70° C.

In a preferred embodiment, one basis unit of the pH swing regeneration device has an operating voltage from 3 V to 10 V, an operating current from 0.1 A to 10 A, and an operating temperature from 5° C. to 70° C.

In accordance with the $CO_2$ adsorption device, the concentration of $CO_2$ may be improved to 1% to 5% from 400 ppm to 2,000 ppm, and the purity of the $CO_2$ gas generated by the $CO_2$ regeneration device may be further improved to be greater than 95%.

Compared with the prior art, the present disclosure has the main advantages as follows:

1. The present disclosure is simple and easy in process, small in equipment volume, and easy to be coupled with a direct capture system and an electrochemical system.
2. The present disclosure is novel in process, and capable of recovering hydroxide that has not reacted with $CO_2$ at room temperature and pressure and thus saving the energy consumption for regeneration of the alkaline solution in the process of directly capturing carbon dioxide.
3. The entire $CO_2$ collection process, compared with an existing process, can be operated at room temperature and pressure, the $CO_2$ capture can be achieved by only using electricity from renewable energy sources, and the entire process has a small carbon footprint and is environmentally friendly.

Figure 1:
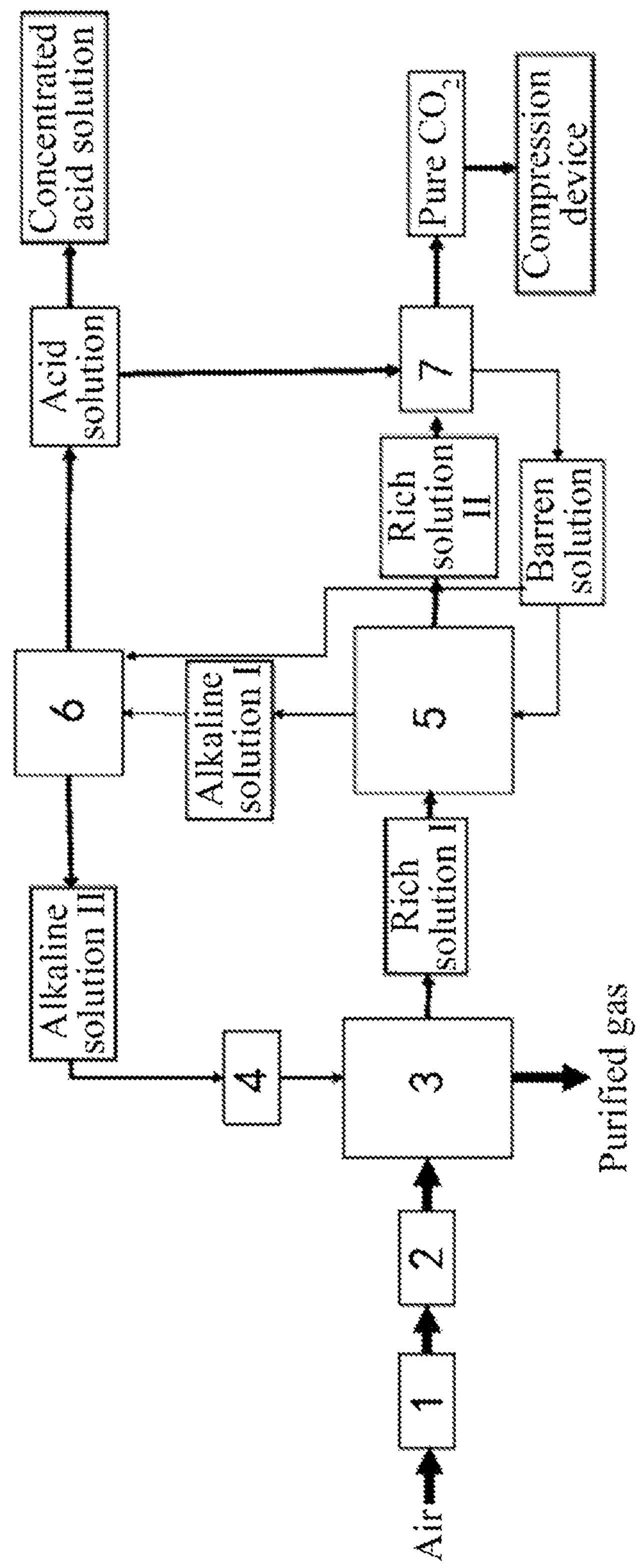
FIG. 1 is a schematic diagram of an energy-saving system for direct air capture with precise ion control in accordance with an embodiment.

In the drawings: 1—air conveying device; 2—air distribution device; 3—$CO_2$ adsorption device; 4—spraying device; 5—valence-state ion sieving device; 6—pH swing regeneration device; 7—$CO_2$ regeneration device; 8—cathode plate; 9—anode plate; 10—cation membrane; 11—valence ion selective anion membrane, 12—$OH^-$ removing chamber; 13—$OH^-$ receiving chamber.

DETAILED DESCRIPTION OF THE EMBODIMENTS

The present disclosure is further set forth below with reference to accompanying drawings and specific embodiments. It should be understood that these embodiments are only used to illustrate the present disclosure rather than limiting the scope of the present disclosure. In the following embodiments, the operation methods without specific conditions are usually in accordance with the conventional conditions or the conditions suggested by the manufacturer.

Figure 2:
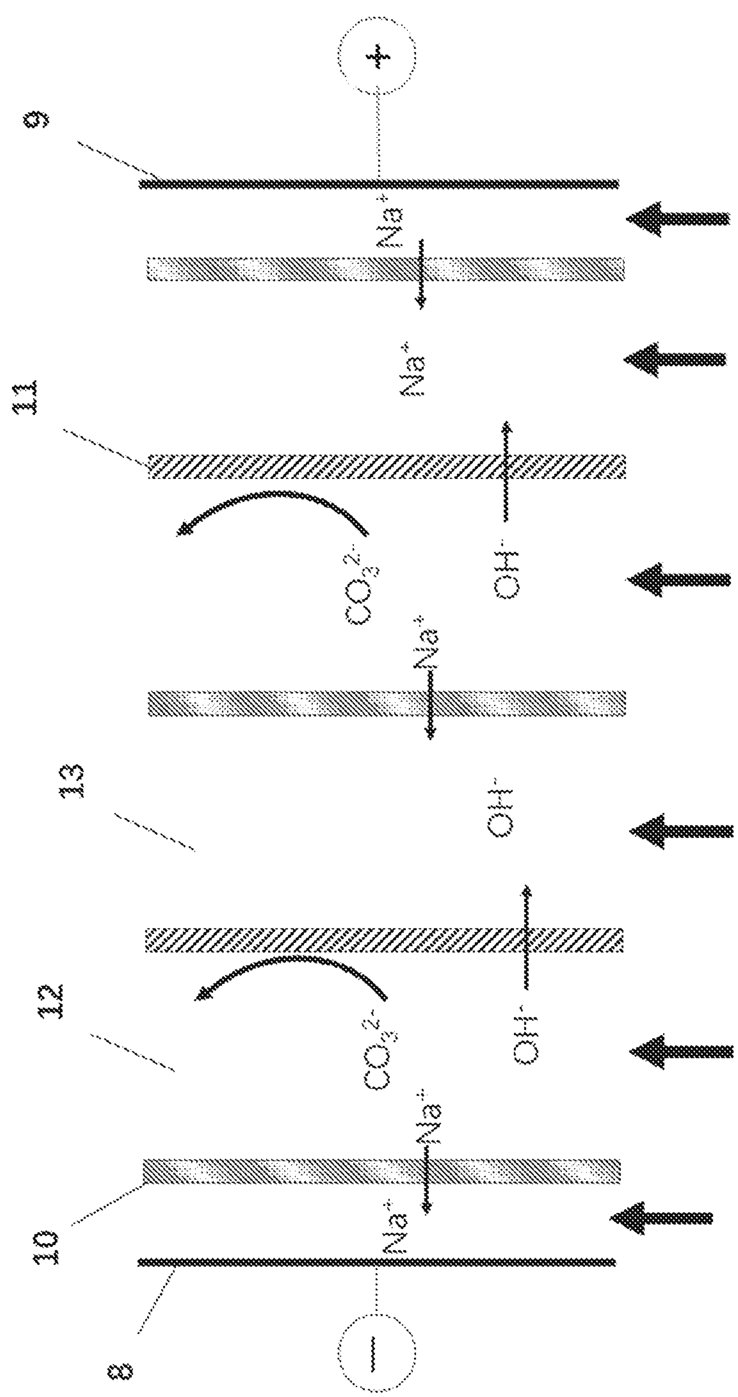
FIG. 2 is a schematic diagram of a valence-state ion sieving device in accordance with an embodiment.

As shown in FIG. 1, an energy-saving system for direct air capture with precise ion control includes:

an air conveying device 1, an air distribution device 2, and a $CO_2$ adsorption device 3 internally provided with a moisture swing adsorbent with high $CO_2$ adsorption capacity, where the air conveying device 1, the air distribution device 2 and the $CO_2$ adsorption device 3 are connected in sequence, and the $CO_2$ adsorption device 3 is provided with a spraying device 4;

a valence-state ion sieving device 5, as shown in FIG. 2, where valence ion selective anion membranes 11 and cation membranes 10 through which $OH^-$ can pass but $CO_3^{2-}$ is prevented are alternately arranged, and an anode plate 9 and a cathode plate 8 are arranged on both sides of the valence-state ion sieving device 5 to form a constant electric field. In the valence-state ion sieving device 5, an $OH^-$ removing chamber 12 receives desorption solution flowing out from the $CO_2$ adsorption device 3, and the aqueous solution rich in $CO_3^{2-}$ flowing out from an outlet of the $OH^-$ removing chamber 12 is pumped into a $CO_2$ regeneration device 7, and an outlet of the $OH^-$ receiving chamber 13 is connected with a pH swing regeneration device 6;

a pH swing regeneration device 6, which employs a pH swing regeneration system and is configured to produce acid solution and to concentrate alkaline solution, where the concentrated alkaline solution outlet is connected to the spraying device 4, the produced acid solution flows into the $CO_2$ regeneration device 7 to react with the aqueous solution rich in $CO_3^{2-}$ to generate $CO_2$ gas, or is partially pumped into the $CO_2$ regeneration device 7 to react with the aqueous solution rich in $CO_3^{2-}$ to generate $CO_2$ gas and is partially concentrated to obtain concentrated acid solution; and a $CO_2$ regeneration device 7, where the acid solution after the $CO_2$ regeneration is completed flows into the $OH^-$ receiving chamber 13 of the valence-state ion sieving device 5, or is partially pumped into the $OH^-$ receiving chamber 13 of the valence-state ion sieving device 5, and is partially pumped into the pH swing regeneration device 6.

Specifically, $CO_2$ adsorbent in the $CO_2$ adsorption device 3 includes at least one of quaternary ammonium-based or quaternary phosphonium-based resin, lignin, activated carbon, molecular sieve, and metal organic framework, and the saturated adsorption capacity is from 0.1 mmol/g to 1.2 mmol/g.

The content of hydroxide ions in the alkali solution sprayed by the spraying device 4 is from 0.1 mol/L to 3 mol/L, which is in the form of sodium hydroxide solution.

The concentration of carbonate ion and the concentration of hydroxide ion in the desorption solution flowing out from the $CO_2$ adsorption device 3 are from 0.1 mol/L to 1 mol/L and from 0.05 mol/L to 2 mol/L, respectively.

In the valence-state ion sieving device 5:

The number of the valence ion selective anion membranes 11 is from 2 to 20, and the area of the membrane is from 100 $cm^2$ to 1,000 $cm^2$.

The cathode plate 8 material includes at least one of titanium-ruthenium-iridium electrodes, carbon electrodes, and stainless-steel electrodes.

The anode plate 9 material includes at least one of ruthenium-iridium coating electrodes, lead plate electrodes, and stainless-steel electrodes.

The cation membrane 10 is at least one of a polytetrafluoroethylene sulfonated acid-based cation exchange membrane and a polystyrene sulfonated acid membrane.

In the valence-state ion sieving device 5, under the action of electric field force, the hydroxide ions may be migrated to a dilute solution side by passing through the valence ion selective anion membranes at a faster speed, and based on the electrostatic repulsion of selective ionic membranes to the carbonate and the strong selectivity of pore size sieving, most of carbonate remains on a concentrated solution side, thus achieving the sieving of two types of ions.

An energy-saving method for direct air capture with precise ion control conducted by utilizing the energy-saving system for direct air capture with precise ion control includes the following steps:

The air enters a $CO_2$ adsorption device 3 through an air conveying device 1 and an air distribution device 2, and then is discharged after $CO_2$ is adsorptively separated in the $CO_2$ adsorption device 3.

Alkaline solution is sprayed by a spraying device 4 to react with $CO_2$ adsorbed by a moisture swing adsorbent with high $CO_2$ adsorption capacity for desorption, the obtained desorption solution containing carbonate ions and hydroxide ions flows into a valence-state ion sieving device 5, and then flows into a $CO_2$ regeneration device 7 to react with acid solution with pH from 2 to 5 after the hydroxide ions are removed, and the generated $CO_2$ gas is collected.

The reacted acid solution in the $CO_2$ regeneration device 7 enters the valence-state ion sieving device 5, or is partially pumped into the valence-state ion sieving device 5 and is partially pumped into a pH regeneration device 6.

The acid solution entering the valence-state ion sieving device 5 flows into the pH swing regeneration device 6 after receiving the hydroxide ions, regenerated alkaline solution flows into the spraying device 4, and regenerated acid solution flows into the $CO_2$ regeneration device 7, or is partially pumped into the $CO_2$ regeneration device 7 and is partially concentrated to obtain concentrated acid solution.

Specifically, the valence-state ion sieving device 5 includes ten basis units, one basis unit has an operating voltage from 1.5 V to 5 V, an operating current from 0.1 A to 10 A, and an operating temperature from 5° C. to 70° C.

The pH swing regeneration device 6 includes ten basis units, one basis unit has an operating voltage from 3 V to 10 V, an operating current from 0.1 A to 10 A, and an operating temperature from 5° C. to 70° C.

The purity of the $CO_2$ gas generated by the $CO_2$ regeneration device 7 is greater than 95%, and the $CO_2$ gas can be compressed into products for commercial application.

The valence-state ion sieving device 5 in the present disclosure may separate the carbonate ions from hydroxide ions, control the content of hydroxide in the aqueous solution rich in $CO_3^{2-}$, and reduce the energy consumption of the system. In the $CO_2$ adsorption device 3, carbon dioxide adsorption materials are used to increase the concentration of carbon dioxide in the air to the same level as that of flue gas, and then the concentration of carbon dioxide is increased to 95% or more by spraying the alkaline solution. The present disclosure is simple and feasible in process flow, small in entire equipment volume, capable of precisely controlling the concentration of aqueous solution rich in $CO_3^{2-}$ and the concentration of barren solution, thus improving the system performance, reducing the energy consumption and facilitating the commercial popularization of the technology of direct air capture of $CO_2$.

In addition, it should be understood that those of ordinary skill in the art may make various changes or modifications to the present disclosure after reading the content described above in the present disclosure, and these equivalent forms also fall within the scope defined by the appended claims.

What is claimed is:

1. An energy-saving system for direct air capture with precise ion control, comprising an air conveying device (1), an air distribution device (2), and a $CO_2$ adsorption device (3) internally provided with moisture swing adsorbents with high $CO_2$ adsorption capacity, wherein the air conveying device (1), the air distribution device (2) and the $CO_2$ adsorption device (3) are connected in sequence, and the $CO_2$ adsorption device (3) is provided with a spraying device (4);

a valence-state ion sieving device (5), wherein valence ion selective anion membranes (11) and cation membranes (10) through which $OH^-$ can pass but $CO_3^{2-}$ is prevented are alternately arranged, and an anode plate (9) and a cathode plate (8) are arranged on both sides of the valence-state ion sieving device (5) to form a constant electric field; in the valence-state ion sieving device (5), an $OH^-$ removing chamber (12) receives desorption solution flowing out from the $CO_2$ adsorption device (3), and the aqueous solution rich in $CO_3^{2-}$ flowing out from an outlet of the $OH^-$ removing chamber is pumped into a $CO_2$ regeneration device (7), and an outlet of the $OH^-$ receiving chamber (13) is connected with a pH swing regeneration device (6);

a pH swing regeneration device (6), which employs a pH swing regeneration system and is configured to produce acid solution and to concentrate alkaline solution, wherein the concentrated alkaline solution outlet is connected to the spraying device (4), the produced acid solution flows into the $CO_2$ regeneration device (7) to react with the aqueous solution rich in $CO_3^{2-}$ to generate $CO_2$ gas, or is partially pumped into the $CO_2$ regeneration device (7) to react with the solution rich in $CO_3^{2-}$ to generate $CO_2$ gas and is partially concentrated to obtain concentrated acid solution;

a $CO_2$ regeneration device (7), wherein the acid solution after the $CO_2$ regeneration is completed flows into the $OH^-$ receiving chamber (13) of the valence-state ion sieving device (5), or is partially pumped into the $OH^-$ receiving chamber (13) of the valence-state ion sieving device (5), and is partially pumped into the pH swing regeneration device (6).

2. The energy-saving system for direct air capture with precise ion control of claim 1, wherein the moisture swing adsorbent with high $CO_2$ capacity in the $CO_2$ adsorption device (3) comprises at least one of quaternary ammonium-based or quaternary phosphonium-based resin, lignin, activated carbon, molecular sieves, and metal organic frameworks, which has the function of spraying alkaline solution or aqueous solution to release $CO_2$.

3. The energy-saving system for direct air capture with precise ion control of claim 1, wherein an electrochemical regeneration system thereof comprises a valence-state ion sieving device (5), a pH swing regeneration device (6), and a $CO_2$ regeneration device (7); the electrochemical regeneration system is able to be used as a central processing unit, a plurality of capture units are coupled with the central processing unit to form a continuous module with precise control system, which is convenient to scale up, wherein the capture units comprise a $CO_2$ adsorption device (3), an air conveying device (1), and an air distribution device (2).

4. The energy-saving system for direct air capture with precise ion control of claim 1, wherein the principle of the system is to achieve adsorption and release of carbon dioxide by using the pH swing, carbon dioxide (400 ppm) in the air is concentrated to 1% to 5% on the adsorbents at first, and then is concentrated to 95% or more by the electrochemical system in the next step.

5. The energy-saving system for direct air capture with precise ion control according to claim 1, wherein the alkaline solution sprayed by the spraying device (4) comprises at least one of organic amine, sodium hydroxide, potassium hydroxide, phosphate and sulfate, and the content of hydroxide ion ranges from 0.1 mol/L to 3 mol/L.

6. The energy-saving system for direct air capture with precise ion control of claim 1, wherein the energy saving property thereof is that the energy consumption of the valence-state ion sieving device (5) is much less than that of the pH swing regeneration device (6); the valence-state ion sieving device (5) is able to selectively sieve out high-concentration $OH^-$ from the mixed solution of carbonate and hydroxide, instead of the original way of neutralization with acid solution, and the recycle of alkaline solution and the storage of acid solution are achieved, and therefore the energy-saving effect is achieved.

7. The energy-saving system for direct air capture with precise ion control of claim 1, wherein the concentration of carbonate ion and the concentration of hydroxide ion in the desorption solution flowing out from the $CO_2$ adsorption device (3) are from 0.1 mol/L to 1 mol/L and from 0.05 mol/L to 2 mol/L, respectively.

8. The energy-saving system for direct air capture with precise ion control of claim 1, wherein in the valence-state ion sieving device (5), structural parameters are designed according to the solution handling capacity, and when the solution handling capacity is 1 liter:

the number of the anion membranes (11) is from 1 to 30, and the area of the single anion membrane is from 100 $cm^2$ to 1,000 $cm^2$;

a basis unit of the valence-state ion sieving device (5) is composed of a cathode plate (8), a partition plate, a cation membrane (10), a partition plate, an anion membrane (11), a partition plate, a cation membrane (10), a partition plate, and an anode plate (9);

the cathode plate (8) materials comprise at least one of titanium-ruthenium-iridium electrodes, carbon electrodes, and stainless-steel electrodes;

the anode plate (9) materials comprise at least one of ruthenium-iridium coating electrodes, lead plate electrodes, and stainless-steel electrodes;

the solution employed by the valence-state ion sieving device (5) comprises at least one of potassium ferricyanide, quinone organic compounds, organic amine, sodium hydroxide, potassium hydroxide, phosphate, and sulfate;

the cation membrane (10) is at least one of polytetrafluoroethylene sulfonated acid-based cation exchange membranes and polystyrene sulfonated acid membranes.

9. An energy-saving method for direct air capture with precise ion control, which utilizes the energy-saving system for direct air capture with precise ion control of claim 1;

the energy-saving method for direct air capture with precise ion control comprises the following steps:

the air enters a $CO_2$ adsorption device (3) through an air conveying device (1) and an air distribution device (2), and then is discharged after $CO_2$ is adsorptively separated in the $CO_2$ adsorption device (3);

alkaline solution is sprayed by a spraying device (4) to react with $CO_2$ adsorbed by moisture swing adsorbents with high $CO_2$ adsorption capacity for desorption, the obtained desorption solution containing carbonate ions and hydroxide ions enters a valence-state ion sieving device (5), and then enters a $CO_2$ regeneration device (7) to react with acid solution with pH from 2 to 5 after the hydroxide ions are removed, and the generated $CO_2$ gas is collected;

the reacted acid solution in the $CO_2$ regeneration device (7) enters the valence-state ion sieving device (5), or is partially pumped into the valence-state ion sieving device (5) and is partially pumped into a pH swing regeneration device (6);

the acid solution in the valence-state ion sieving device (5) flows into the pH swing regeneration device (6) after receiving the hydroxide ions, regenerated alkaline solution is pumped into the spraying device (4), and the regenerated acid solution flows into the $CO_2$ regeneration device (7), or is partially pumped into the $CO_2$ regeneration device (7) and is partially concentrated to obtain high concentrated acid solution.

10. The energy-saving method for direct air capture with precise ion control of claim 9, wherein in the valence-state ion sieving device (5), one basis unit has an operating voltage from 1.5 V to 5 V, an operating current from 0.1 A to 10 A, and an operating temperature from 5° C. to 70° C.

11. The energy-saving method for direct air capture with precise ion control of claim 9, wherein in the pH swing regeneration device (6), one basis unit has an operating voltage from 3 V to 10 V, an operating current from 0.1 A to 10 A, and an operating temperature from 5° C. to 70° C.

* * * * *